(12) United States Patent
Fukumoto et al.

(10) Patent No.: US 11,880,729 B2
(45) Date of Patent: Jan. 23, 2024

(54) RFID TAG

(71) Applicant: KYOCERA Corporation, Kyoto (JP)

(72) Inventors: Katsuhiko Fukumoto, Kyoto (JP); Noritaka Niino, Kyoto (JP)

(73) Assignee: KYOCERA CORPORATION, Kyoto (JP)

( * ) Notice: Subject to any disclaimer, the term of this patent is extended or adjusted under 35 U.S.C. 154(b) by 43 days.

(21) Appl. No.: 17/637,273

(22) PCT Filed: Aug. 13, 2020

(86) PCT No.: PCT/JP2020/030781
§ 371 (c)(1),
(2) Date: Feb. 22, 2022

(87) PCT Pub. No.: WO2021/039421
PCT Pub. Date: Mar. 4, 2021

(65) Prior Publication Data
US 2022/0284201 A1    Sep. 8, 2022

(30) Foreign Application Priority Data

Aug. 23, 2019  (JP) .................................. 2019-152423

(51) Int. Cl.
*G06K 7/10* (2006.01)
*G06K 19/07* (2006.01)
*G06T 11/20* (2006.01)
*G06T 11/60* (2006.01)

(52) U.S. Cl.
CPC ..... *G06K 7/10366* (2013.01); *G06K 19/0723* (2013.01); *G06T 11/203* (2013.01); *G06T 11/60* (2013.01)

(58) Field of Classification Search
CPC ............ G06K 7/10366; G06K 19/0723; B06T 11/203
USPC ......................................................... 235/492
See application file for complete search history.

(56) References Cited

U.S. PATENT DOCUMENTS

| | | | |
|---|---|---|---|
| 2005/0218218 A1 | 10/2005 | Koster | |
| 2012/0325905 A1* | 12/2012 | Kim ................. | G06K 19/07707 235/492 |
| 2014/0019311 A1* | 1/2014 | Tanaka ............... | G06Q 30/0643 705/27.2 |
| 2018/0130160 A1* | 5/2018 | Alexander ............. | G06Q 20/12 |
| 2020/0356735 A1* | 11/2020 | Wilkinson ......... | G06K 7/10108 |
| 2021/0223856 A1* | 7/2021 | Bikumandla ........... | G06F 3/012 |

(Continued)

FOREIGN PATENT DOCUMENTS

| AU | 610904 B2 | 5/1991 |
|---|---|---|
| JP | 2002-065418 A | 3/2002 |

(Continued)

*Primary Examiner* — Allyson N Trail
(74) *Attorney, Agent, or Firm* — Volpe Koenig

(57) ABSTRACT

An RFID tag includes an IC for RFID to which information for presentation can be written by wireless communication, a display, and a control circuit configured to output presentation data to the display. The control circuit includes a font repository storing font data and a data processor configured to create the presentation data by using one or more character codes and the font data, the one or more character codes being included in the information for presentation.

11 Claims, 9 Drawing Sheets

(56) References Cited

U.S. PATENT DOCUMENTS

2022/0178805 A1* 6/2022 Simmons .............. G01N 11/10
2022/0284201 A1* 9/2022 Fukumoto .......... G06K 7/10366

FOREIGN PATENT DOCUMENTS

| | | |
|---|---|---|
| JP | 2009-110039 A | 5/2009 |
| WO | 2013/039395 A1 | 3/2013 |

* cited by examiner

FIG. 3

| INFORMATION FOR PRESENTATION ||
|---|---|
| RULED-LINE DATA 1 | START POSITION, END POSITION |
| RULED-LINE DATA 2 | START POSITION, END POSITION |
| ⋮ | ⋮ |
| CHARACTER-STRING DATA 1 | POSITIONAL INFORMATION FOR PRESENTATION, CHARACTER-CODE SEQUENCE |
| CHARACTER-STRING DATA 2 | POSITIONAL INFORMATION FOR PRESENTATION, CHARACTER-CODE SEQUENCE |
| ⋮ | ⋮ |
| IMAGE DATA 1 | POSITIONAL INFORMATION FOR PRESENTATION, RASTER DATA |
| IMAGE DATA 2 | POSITIONAL INFORMATION FOR PRESENTATION, RASTER DATA |
| ⋮ | ⋮ | ns
RFID TAG

TECHNICAL FIELD

The present disclosure relates to an RFID tag having a display.

BACKGROUND

Japanese Unexamined Patent Application Publication No. 2002-65418 discloses an RFID tag that presents product information on a display. Information is written to the RFID tag by using a reader/writer, and thus product information to be presented by the RFID tag can be updated.

SUMMARY

An RFID tag according to the present disclosure includes
an IC for RFID to which information for presentation can be written by wireless communication,
a display, and
a control circuit configured to output presentation data to the display.
The control circuit includes
a font repository storing font data, and
a data processor configured to create the presentation data by using one or more character codes and the font data, the one or more character codes being included in the information for presentation.

BRIEF DESCRIPTION OF DRAWINGS

FIG. 3 is a data chart depicting an example of information for presentation.

DETAILED DESCRIPTION

Hereinafter, each embodiment of the present disclosure will be described in detail with reference to the drawings.

First Embodiment

Figure 1:
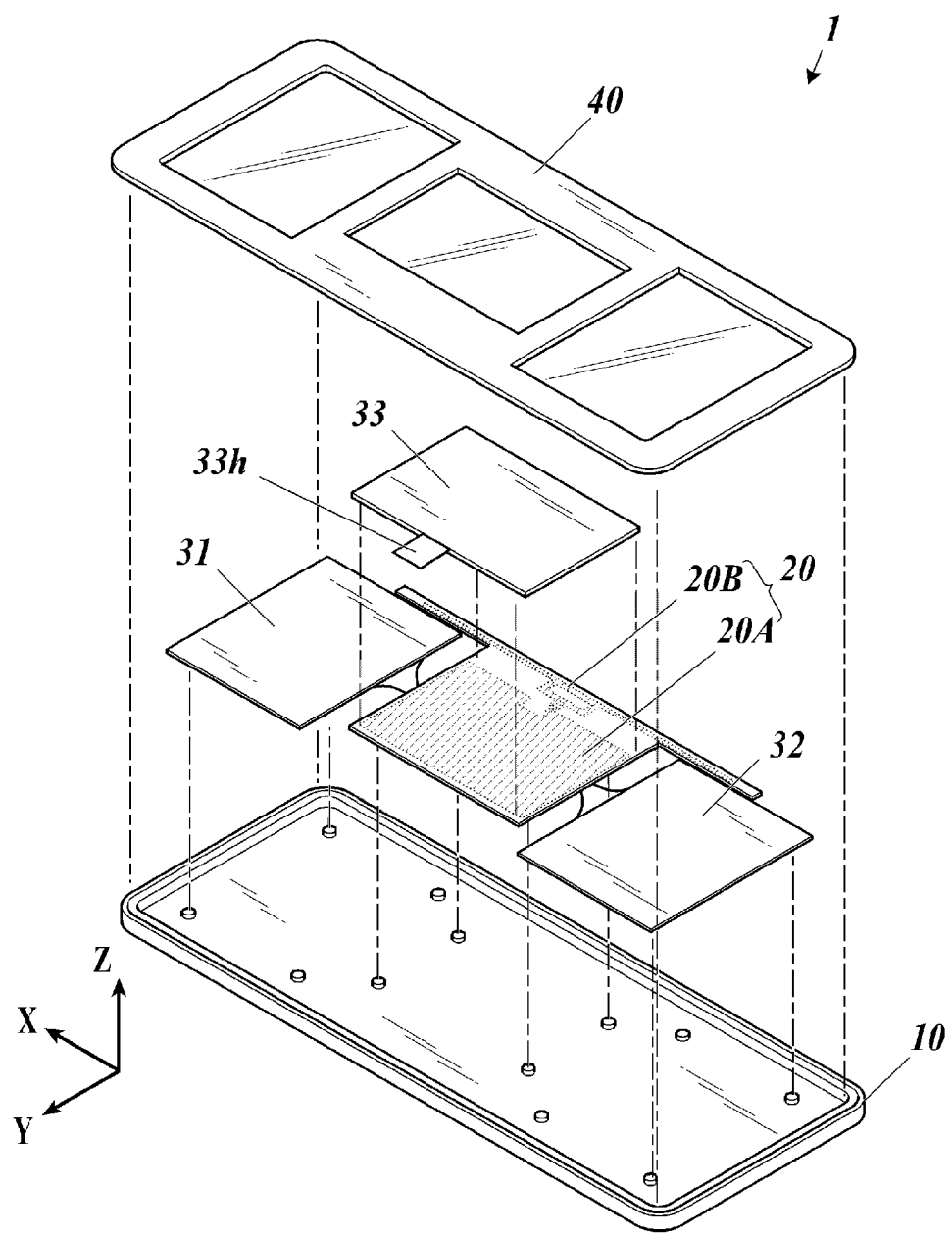
FIG. 1 is an exploded perspective view depicting an RFID tag according to a first embodiment of the present disclosure.
Figure 2:
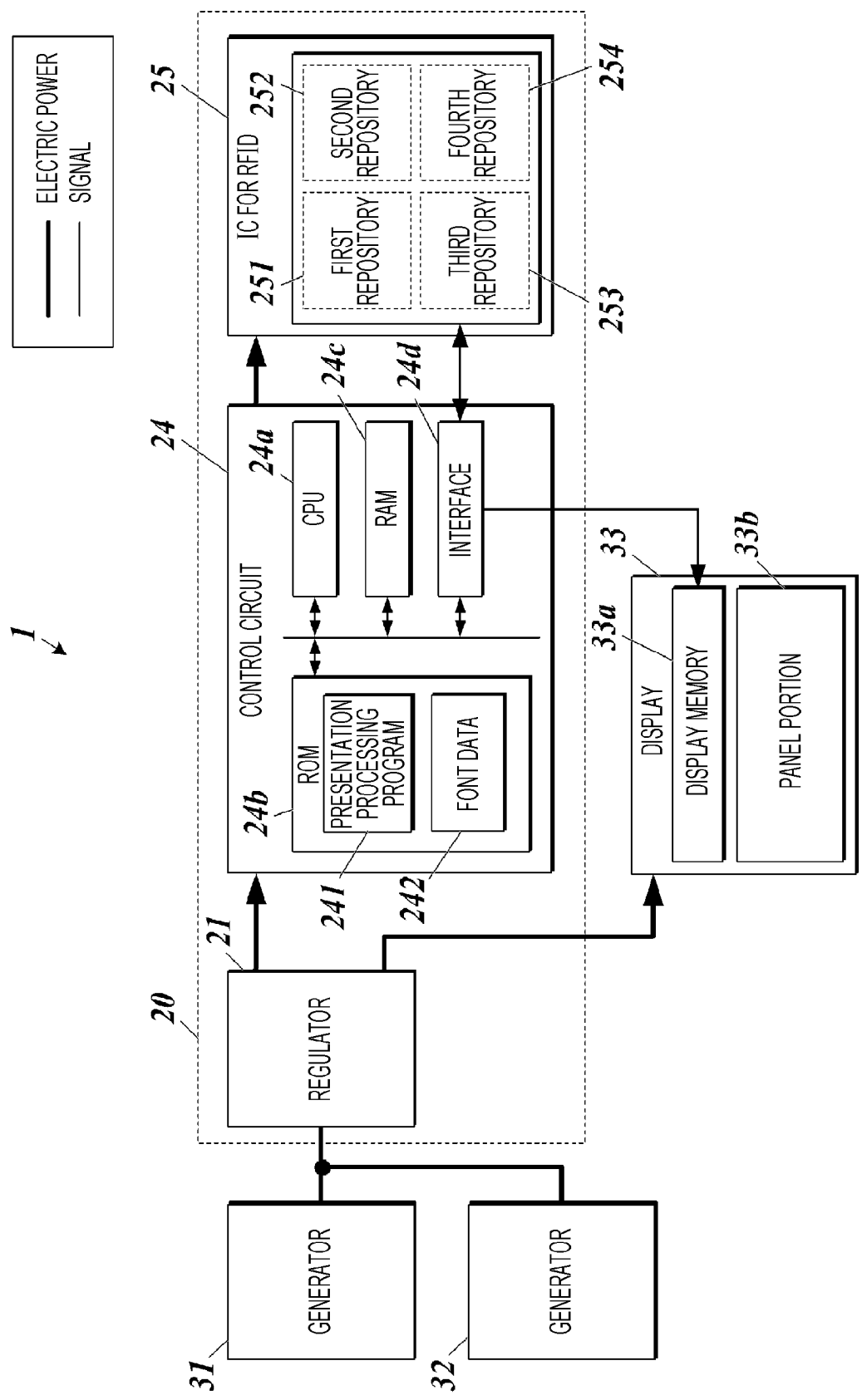
FIG. 2 is a block diagram depicting an internal configuration of the RFID tag according to the first embodiment.

FIG. 1 is an exploded perspective view depicting an RFID tag according to a first embodiment. FIG. 2 is a block diagram depicting an internal configuration of the RFID tag according to the first embodiment.

A radio frequency identifier (RFID) tag 1 according to the first embodiment includes a casing 10, a circuit board 20, generators 31 and 32, a display 33, and a cover 40 as depicted in FIG. 1. The casing 10 has raised edges on one surface and can accommodate the display 33 placed on top of the circuit board 20 together with the two generators 31 and 32 disposed one each on the right-hand and left-hand sides of the display 33. The circuit board 20 has a main portion 20A on which multiple integrated circuits are mounted and an extended portion 20B having an antenna conductor. The generators 31 and 32 are each formed by a photovoltaic panel configured to generate electricity by receiving light from outside. The generators 31 and 32 may be formed by other kinds of devices, such as an energy-harvesting generator configured to generate electricity by absorbing heat or vibration.

As depicted in FIG. 2, the RFID tag 1 further includes a regulator 21, an integrated circuit (IC) for RFID 25, and a control circuit 24. The regulator 21 is configured to produce a power-supply voltage from electric power generated by the generators 31 and 32 and supply the power-supply voltage to each circuit. The IC for RFID 25 is configured to communicate with a reader/writer by wireless communication through an electromagnetic wave, and the control circuit 24 is configured to perform information processing. The regulator 21 may be configured to produce two power-supply voltage systems. One of the systems is used to power the control system, and the other is used to drive display components. The IC for RFID 25, the control circuit 24, and the regulator 21 are mounted on the circuit board 20.

The IC for RFID 25 is configured to communicate with a reader/writer by wireless communication, for example, through an electromagnetic wave in the ultra high frequency (UHF) band. The IC for RFID 25 includes first to fourth repositories 251 to 254. The first repository 251 can read and write information from and to a reader/writer, the second repository 252 is configured to store an identification code, the third repository 253 is configured to store identification information of the IC, and the fourth repository 254 is configured to store control data for security. The first to fourth repositories 251 to 254 each may be formed by a non-volatile memory.

The control circuit 24 is formed by a microcomputer that includes a central processing unit (CPU) 24a, a read-only memory (ROM) 24b, a random-access memory (RAM) 24c, and an interface 24d. The ROM 24b is configured to store a presentation processing program 241. The presentation processing program 241 is configured to read information for presentation from the IC for RFID 25, create presentation data by using the information that has been read, and output the presentation data to the display 33. In addition, the ROM 24b is configured to store font data 242 that is a collection of raster data representing character imagery (images of characters and images of pictograms). The data volume of the font data 242 can be reduced by reducing the number of characters and reducing the number of character sizes. The ROM 24b corresponds to an example of a font repository according to the present disclosure. Rewritable non-volatile memory may be used instead of the ROM 24b. The memory that stores the font data 242 may be different from the memory that stores a control program. The CPU 24a, which is configured to execute the presentation processing program 241, corresponds to an example of a data processor according to the present disclosure.

Examples of the display 33 include a liquid crystal display, and the display 33 is electrically connected to the circuit board 20 by using electrical wiring (such as film wiring) 33h (refer to FIG. 1). The display 33 includes a display memory 33a large enough to store presentation data for displaying at least one screen and a panel portion 33b to be driven based on the presentation data in the display memory 33a. The presentation data provides a pixel value (for example, "1: turned on" or "0: blinking") for each pixel included in a single screen displayed by the panel portion 33b. Each address included in the display memory 33a is associated in advance with a pixel included in the panel portion 33b, and in response to a pixel value written to the display memory 33a at an address, a pixel of the panel portion 33b that corresponds to the address is driven in accordance with the pixel value. Then, an image is output to the panel portion 33b in accordance with the presentation data.

<Presentation Processing>

Figure 4:
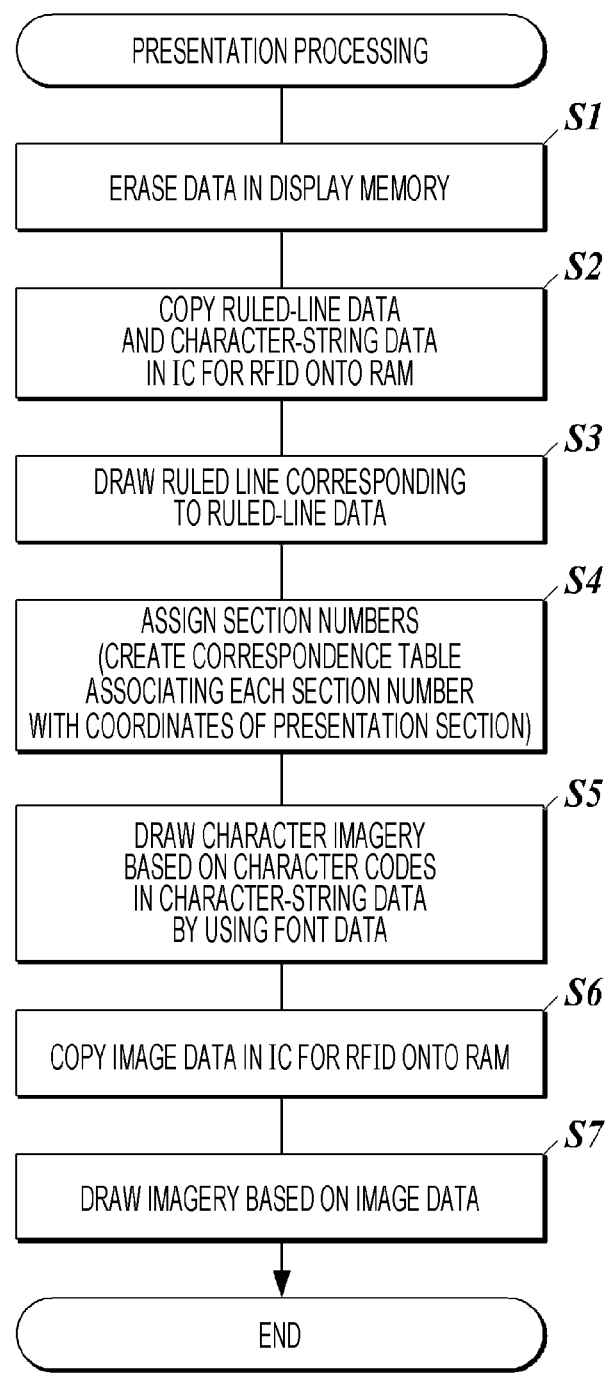
FIG. 4 is a flowchart depicting presentation processing performed by a CPU of a control circuit.
Figure 5:
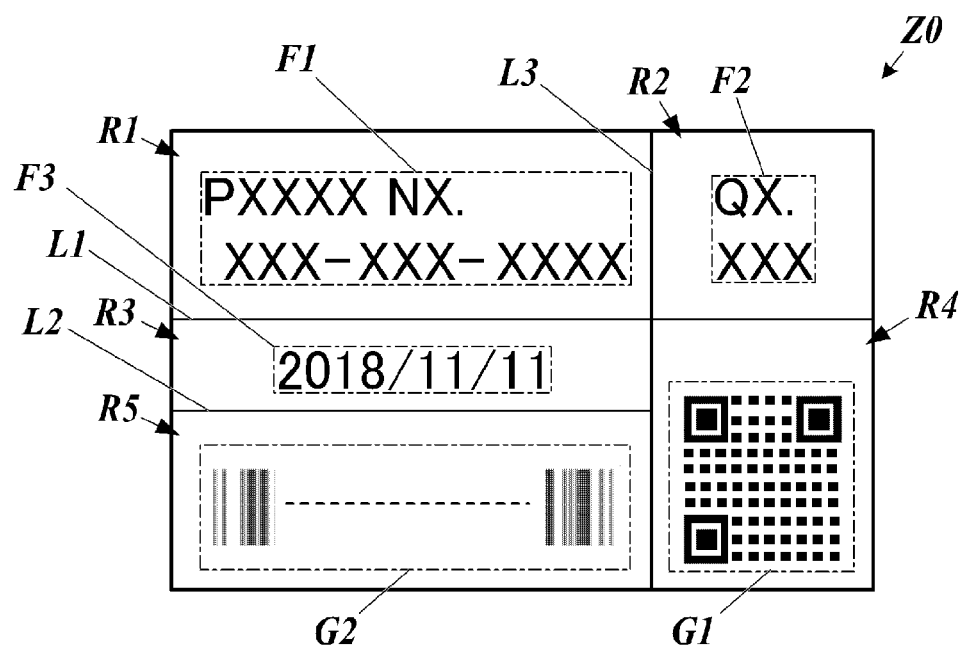
FIG. 5 illustrates an image depicting a presentation example of a display.

Next, description will be given with regard to an operation performed by the display 33 to output information written by an external reader/writer. FIG. 3 is a data chart depicting an example of information for presentation to be written by a reader/writer. FIG. 4 is a flowchart depicting a procedure of presentation processing performed by the CPU 24a of the control circuit 24. FIG. 5 illustrates an image depicting a presentation example of the display 33.

The output from the display 33 can be updated by writing by using a reader/writer information for presentation provided from outside the RFID tag 1. The information for presentation can include one or more pieces of ruled-line data, one or more pieces of character-string data, and one or more pieces of image data as depicted in FIG. 3. A piece of ruled-line data includes information regarding positions, such as the start position and the end position of a ruled line. A piece of ruled-line data may include information regarding the start position, the length, and the direction of a ruled line. Information regarding a position included in a piece of ruled-line data is represented by coordinates in a presentation screen. A piece of character-string data includes positional information for presentation and a character-code sequence representing multiple characters. The positional information for presentation may be a section number indicating one of presentation sections R1 to R5 demarcated by ruled lines L1 to L3 (refer to FIG. 5). If multiple presentation sections are formed by dividing a presentation screen by using ruled lines, a section number may be assigned to each presentation section in a predetermined order (for example, numbered sequentially from top left to bottom right). A piece of image data includes positional information for presentation and a piece of raster data (a two-dimensional sequence of pixel values) representing a pattern. The positional information for presentation may be a section number described above. A piece of image data represents a pattern capable of presenting numerous code patterns for presentation (for example, a barcode or a two-dimensional code (QR code (registered trademark)). The positional information for presentation in a piece of character-string data and in a piece of image data is not limited to a section number, and examples of the positional information include information represented by coordinates in the presentation screen. Further, the positional information for presentation in a piece of character-string data may be assigned to each character.

When the information for presentation described above is written to the first repository 251 of the IC for RFID 25 and the trigger for the presentation processing is activated, the CPU 24a of the control circuit 24 performs the presentation processing in FIG. 4. Examples of the trigger for the presentation processing include the activation of the control circuit 24 and a notification received from the IC for RFID 25 with regard to information update.

Once the presentation processing starts, the CPU 24a first erases data in the display memory 33a of the display 33 (step S1).

Next, the CPU 24a identifies one or more pieces of ruled-line data and one or more pieces of character-string data in the information for presentation written to the first repository 251 of the IC for RFID 25 and copies the one or more pieces of ruled-line data and the one or more pieces of character-string data onto the RAM 24c (step S2). Then, to draw a ruled line corresponding to each piece of ruled-line data on the display 33, the CPU 24a writes pixel values (presentation data) to the display memory 33a at corresponding addresses (step S3). More specifically, the CPU 24a calculates coordinates of each point in the ruled line based on the piece of ruled-line data and writes a pixel value (for example, "1") to the display memory 33a at an address that corresponds to each point located at the calculated coordinates. A ruled line is drawn by writing pixel values in this way.

After completing processing of drawing all the ruled lines, the CPU 24a performs computing processing to assign a section number to each of multiple presentation sections demarcated by the ruled lines in the presentation screen (step S4). In step S4, the CPU 24a further creates a correspondence table associating each section number with coordinates of the corresponding presentation section. A character string and a pattern are each drawn in a presentation section based on a section number as described below. In other words, based on the ruled lines, the CPU 24a determines a position at which each of a character string and a pattern is presented.

Next, the CPU 24a uses the one or more pieces of character-string data, which have been copied onto the RAM 24c, and the font data 242 and performs processing of drawing a character string on the display 33 in accordance with each of the one or more pieces of character-string data (step S5). In step S5, the CPU 24a extracts from the font data 242 raster data of a character corresponding to each character code included in each piece of character-string data. Further, by using the positional information for presentation included in each piece of character-string data, the CPU 24a determines the coordinate range in which the character string is presented in the presentation screen. If the positional information for presentation is a section number indicating a section demarcated by ruled lines, the CPU 24a can determine the coordinate range corresponding to the section number in the presentation screen by using the correspondence table created in step S5. Presentation data is obtained by arranging the raster data of each character in accordance with the order of the character codes, and the CPU 24a writes the presentation data obtained in this way to the display memory 33a at the addresses corresponding to the coordinate range determined above. The character string is drawn in the corresponding presentation section in the presentation screen by such a writing operation. The CPU 24a proceeds to the next step after completing drawing for all the pieces of character-string data.

Next, the CPU 24a identifies one or more pieces of image data in the information for presentation written to the first repository 251 of the IC for RFID 25 and copies the one or more pieces of image data onto the RAM 24c (step S6). Then, the CPU 24a performs drawing processing for each piece of image data (step S7). In step S7, the CPU 24a reads the positional information for presentation and the raster data included in each piece of image data. Then, based on the positional information for presentation, the CPU 24a determines the coordinate range in which a pattern is presented in the presentation screen and writes the raster data to the display memory 33a at the addresses corresponding to the coordinate range. The pattern is drawn in the corresponding section in the presentation screen by such a writing operation. The CPU 24a terminates the presentation processing after completing drawing for all the pieces of image data.

When each pixel of the panel portion 33b is driven based on the presentation data written in the presentation processing in FIG. 4, imagery for presentation Z0 such as is depicted in FIG. 5 is output to the panel portion 33b. In the example in FIG. 5, of five presentation sections R1 to R5 demarcated by ruled lines L1 to L3, three character strings F1 to F3 are presented in the presentation sections R1 to R3, respectively, patterns G1 and G2, which are a two-dimensional code and a barcode, are presented in the presentation sections R4 and R5, respectively. The ruled lines L1 to L3 are presented based on ruled-line data, the character strings F1 to F3 are presented based on character-string data, and the patterns G1 and G2 are presented based on image data.

Information for presentation written by using a reader/writer contains ruled-line data, character-string data, and image data. Ruled-line data is mainly formed by coordinate data, and character-string data is mainly formed by one or more character codes. Only image data is formed by raster data, which requires a large data volume. Accordingly, the data volume of the information for presentation is smaller than the data volume required to present all the content in the presentation screen by using image data such as raster data. Such reduction in the data volume is due to the reduction in the data volume required to present the ruled lines and the character strings. Thus, if a screen having a large number of pixels is adopted as the display 33 and a large amount of information is to be presented, the capacity of the first repository 251 of the IC for RFID 25 provided for the information for presentation is likely to be insufficient to present all the content in the presentation screen as image data. However, according to the configuration in the first embodiment, even when a large amount of information is to be presented, a situation in which the capacity of the first repository 251 of the IC for RFID 25 is insufficient can be avoided.

Further, since the data volume of the information for presentation to be written by using a reader/writer can be reduced, a period required for writing data to the RFID tag 1 to update presentation can be reduced, and the power consumption of the RFID tag 1 during the period can be reduced.

Figure 6A:
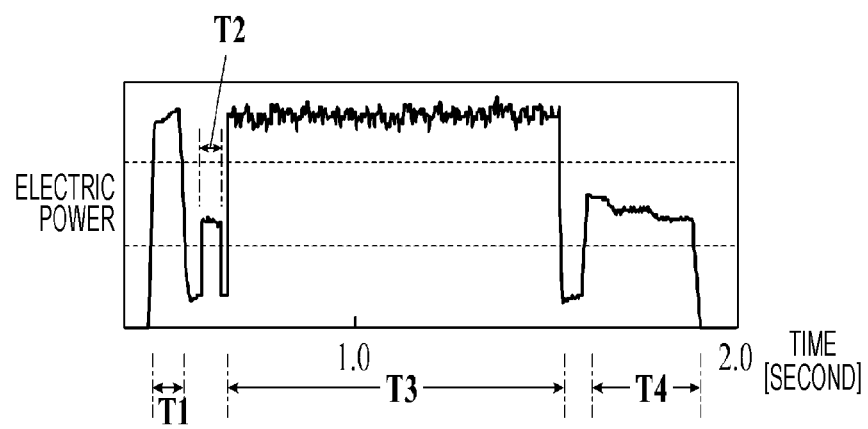
FIG. 6A is a timing chart describing a processing time sequence of presentation processing.
Figure 6B:
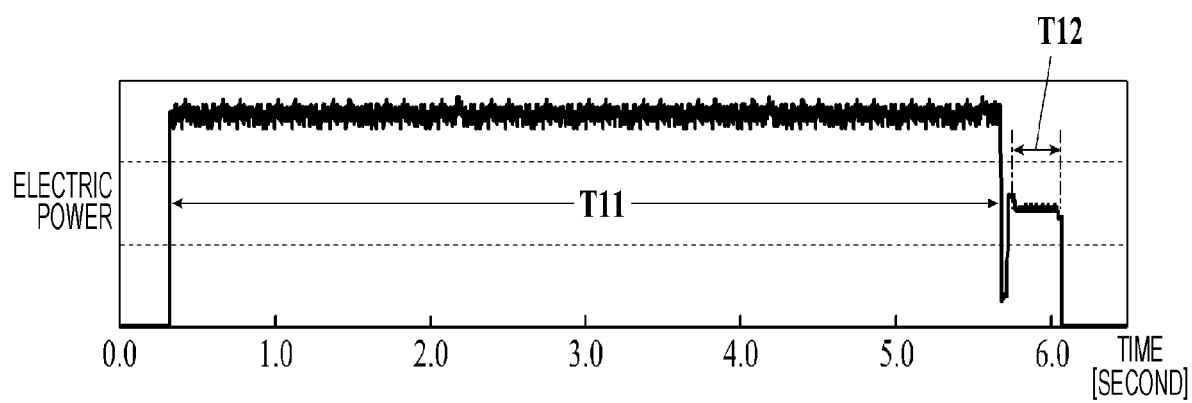
FIG. 6B is a timing chart describing a processing time sequence of presentation processing according to a comparative example.

In addition, since the data volume of the information for presentation is reduced, internal processing of the RFID tag 1 can be improved. FIG. 6A is a timing chart describing a processing time sequence of the presentation processing in FIG. 4, and FIG. 6B is a timing chart according to a comparative example. FIG. 6B according to the comparative example represents a processing time sequence for presenting all the information for presentation by using image data such as raster data.

In FIG. 6A, a period T1 represents a time period for copying ruled-line data and character-string data onto the RAM 24c, and a period T2 represents a time period for writing the presentation data (pixel-value data) of ruled lines and character strings onto the display memory 33a. Similarly, a period T3 represents a time period for copying image data onto the RAM 24c, and a period T4 represents a time period for writing the presentation data (raster data) of patterns onto the display memory 33a. In FIG. 6B, a period T11 represents a time period for copying image data of all the content in the presentation screen onto the RAM 24c, and a period T12 represents a time period for writing the image data onto the display memory 33a.

As is evident from the comparison between FIG. 6A and FIG. 6B, a time period (the period T1+the period T3) required for the CPU 24a of the control circuit 24 to copy the information for presentation in the IC for RFID 25 onto the RAM 24c is substantially reduced in the present embodiment. This is because the data volume of the information representing the ruled lines and the character strings is small. The speed of communication between the control circuit 24 and the IC for RFID 25 is not fast, and the reduction in these time periods is at a noticeable level.

In addition, a substantial reduction in the data copying period enables the power consumption for data transmission to decrease. When the power generation at the generators 31 and 32 is at a low level, an increase in the total power consumption for presentation processing causes a decrease in the power-supply voltage for the control circuit 24 during operation, leading to unstable processing in some cases. However, since the presentation processing according to the first embodiment reduces the total power consumption because of the reduction in the data transmission period, unstable processing can be avoided even for power generation at a low level.

As described above, the RFID tag 1 according to the first embodiment creates presentation data to be output to the display 33 by using one or more character codes and the font data 242, and thus a time period for transmitting information for presentation and power consumption for data transmission can be reduced. Accordingly, the CPU 24a can perform stable presentation processing at a high speed and with low power consumption even if the amount of information to be presented by the display 33 increases.

In addition, the CPU 24a of the control circuit 24 in the RFID tag 1 according to the first embodiment identifies character-string data, ruled-line data, and image data in the information for presentation. Then, in accordance with such data, the CPU 24a creates presentation data of the imagery for presentation Z0 (FIG. 5) including the character strings F1 to F3, the ruled lines L1 to L3, and the patterns G1 and G2 and writes the presentation data onto the display memory 33a. Thus, the ruled lines L1 to L3 and the character strings F1 to F3 can be output to the display 33 with a small data volume. Further, since image data can be used, the patterns G1 and G2 having numerous code patterns for presentation (for example, a two-dimensional code or a barcode) can also be included in the imagery for presentation Z0. Although an image such as a two-dimensional code or a barcode can be encoded, if such an image is encoded, control data or a control program having a large data volume is required to convert encoded data into a pattern. In such a case, the capacity of the ROM 24b of the control circuit 24 needs to be increased, leading to an increased cost of the RFID tag 1 and increased power consumption for standard operation of the RFID tag 1. However, in the RFID tag 1 according to the first embodiment, since image data can be used for a pattern having numerous code patterns for presentation, the capacity of the ROM 24b can be reduced, leading to a reduced cost and a reduction in power consumption for standard operation.

Further, the CPU 24a of the control circuit 24 in the RFID tag 1 according to the first embodiment determines based on the presentation sections R1 to R5 a position at which each of the character strings F1 to F3 is presented and a position at which each of the patterns G1 and G2 is presented. The presentation sections R1 to R5 are demarcated by the ruled lines L1 to L3. Thus, positions at which character strings and patterns are presented need not be specified in detail in the information for presentation, leading to a less troublesome procedure for creating the information for presentation.

In the example described in the first embodiment, the imagery for presentation Z0 include the character strings F1 to F3, the ruled lines L1 to L3, and the patterns (such as two-dimensional codes or barcodes) G1 and G2 as image elements. However, a configuration in which a ruled line, a pattern, or both a ruled line and a pattern are not included as image elements is also possible. Further, in the example described in the first embodiment, the section numbers of the presentation sections R1 to R5 demarcated by the ruled lines L1 to L3 are attached as the positional information for presentation of the character strings F1 to F3. However, coordinates on the display 33 may be attached to a piece of character-string data as the positional information for presentation, or coordinates may individually be attached to each character code in a character string as the positional information for presentation. Further, character-string data may include size data indicating the size of a character (a scaling factor for a font). In such a case, the CPU 24a may create presentation data by enlarging or reducing an image of raster data extracted from the font data 242 based on the size data, and the CPU 24a may write the created presentation data onto the display memory 33a. Similarly, image data may include size data indicating the size of a pattern (a scaling factor). In such a case, the CPU 24a may create presentation data by enlarging or reducing an image of raster data included in the image data based on the size data, and the CPU 24a may write the created presentation data onto the display memory 33a.

Second Embodiment

An RFID tag 1 according to a second embodiment has a configuration similar to the configuration in the first embodiment except that a procedure for presentation processing is different. The RFID tag 1 according to the second embodiment has a configuration that can handle a situation in which the amount of information for presentation to be written by using a reader/writer exceeds the capacity of the first repository 251 of the IC for RFID 25. If information for presentation includes a large amount of image data, the total data volume can exceed the capacity of the first repository 251.

In the second embodiment, when a reader/writer writes information for presentation to the first repository 251 of the IC for RFID 25 and the data volume of the information for presentation exceeds the capacity of the first repository 251, the reader/writer splits the information for presentation into multiple parts and individually writes the multiple parts to the first repository 251. For example, the reader/writer may check the data volume of the information for presentation in advance and select split writing if the data volume exceeds a predetermined amount. Alternatively, the IC for RFID 25 may send to the reader/writer a notification of a decrease in the remaining capacity of the first repository 251, and the reader/writer may passively select split writing in response to the notification. When split writing is performed, the reader/writer or the IC for RFID 25 performs control so as to add ancillary information indicating split writing to the information for presentation.

Figure 7:
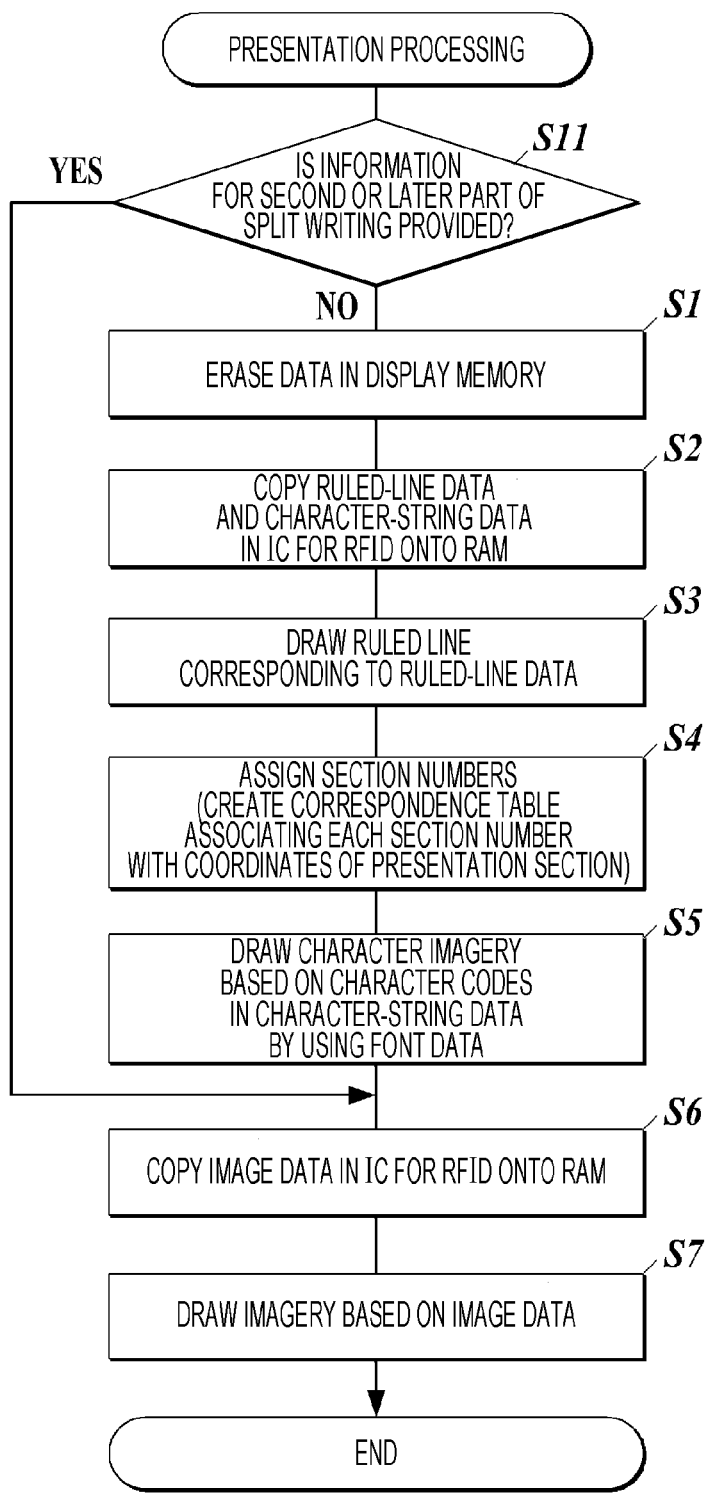
FIG. 7 is a flowchart depicting presentation processing according to a second embodiment.

FIG. 7 is a flowchart depicting a procedure of presentation processing according to the second embodiment. Of the steps in FIG. 7, steps similar to the corresponding steps in FIG. 4 are denoted by the same reference signs, and detailed description will be omitted for those steps.

The CPU 24a according to the second embodiment starts presentation processing in FIG. 7 in response to a notification received from the IC for RFID 25 regarding update of information in the first repository 251. Then, the CPU 24a first determines based on the ancillary information whether the information for presentation in the first repository 251 of the IC for RFID 25 provides information for a second or later part of split writing (step S11). If it is determined affirmatively, the CPU 24a skips the processing of clearing the display memory 33a (step S1) and the processing of drawing ruled lines and character strings (steps S2 to S5) and proceeds to the processing of copying image data (step S6). In step S6, if a piece of image data has partially been copied onto the RAM 24c in the split writing immediately preceding the current writing, the CPU 24a may perform processing of copying the remaining portion of the piece of image data so that the remaining portion combines with the portion that has been copied onto the RAM 24c. Then, the drawing processing for a piece of combined image data may be performed in the drawing processing on the display 33 in step S7.

When information for presentation is split into multiple parts and the multiple parts are written individually in the second embodiment, the presentation processing is performed every time a part is written. The output of imagery for presentation including the ruled lines, the character strings, and all the patterns that are included in the information for presentation is completed when the presentation processing for all the parts of the information for presentation that has been split is completed.

As described above, even when the amount of image data is large and the data volume of the information for presentation exceeds the capacity of the first repository 251 of the RFID tag 1, the RFID tag 1 according to the second embodiment can output and present all the information by performing split writing multiple times.

When a reader/writer writes parts of the information for presentation, which has been split, to the RFID tag 1 according to the second embodiment, a second writing needs to wait until a time to be used for presentation processing elapses after a first writing. The reader/writer may achieve this waiting by measuring a predetermined time period. Alternatively, a configuration in which a first flag region is disposed in the first repository 251 may be adopted. In this configuration, the first flag region is disposed to indicate whether presentation processing is being performed or has finished. The reader/writer monitors the first flag region, and if the first flag region indicates that the presentation processing has finished, the reader/writer writes the next part of the information for presentation.

Third Embodiment

Figure 8:
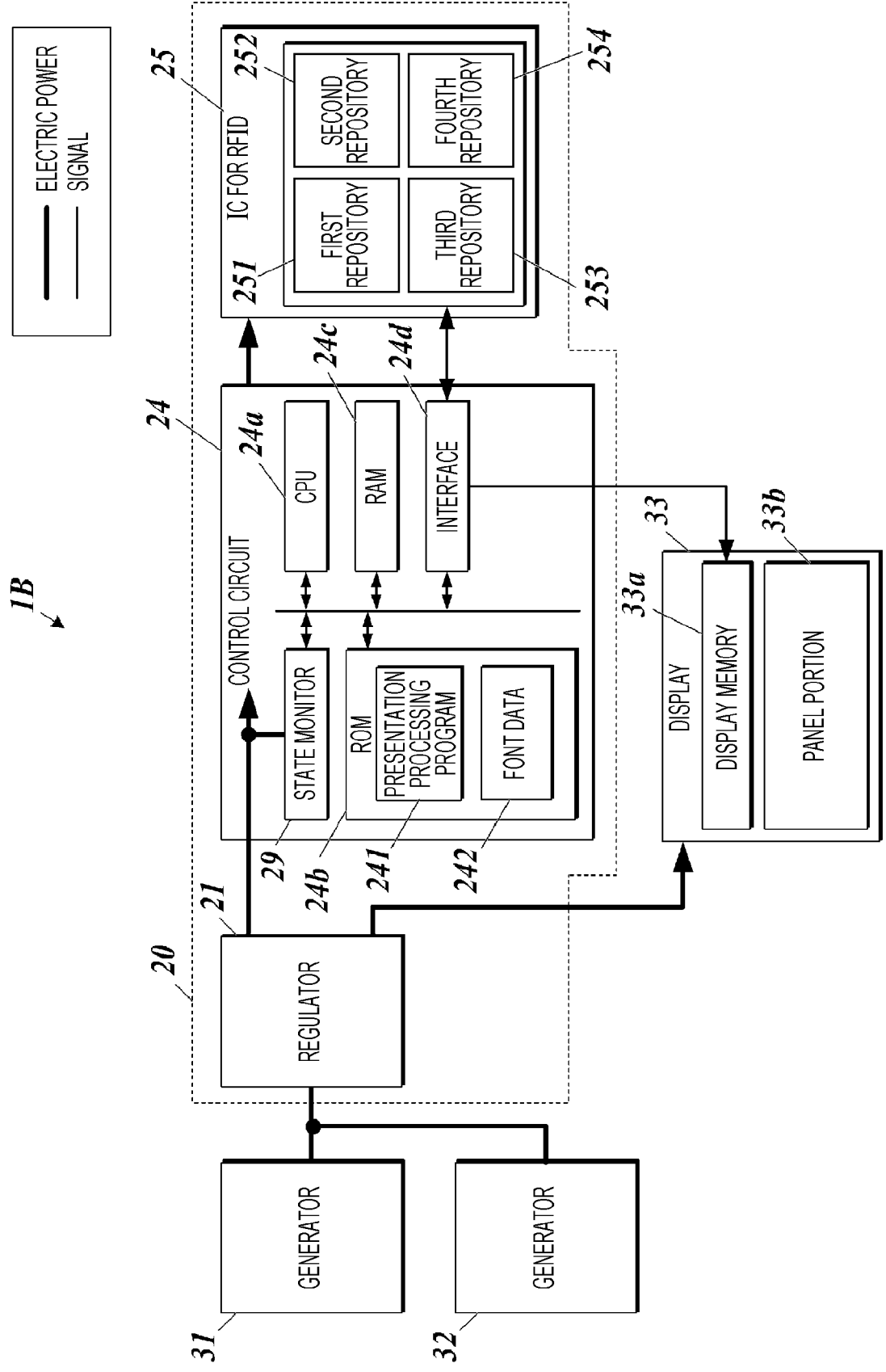
FIG. 8 is a block diagram depicting an internal configuration of an RFID tag according to a third embodiment.
Figure 9:
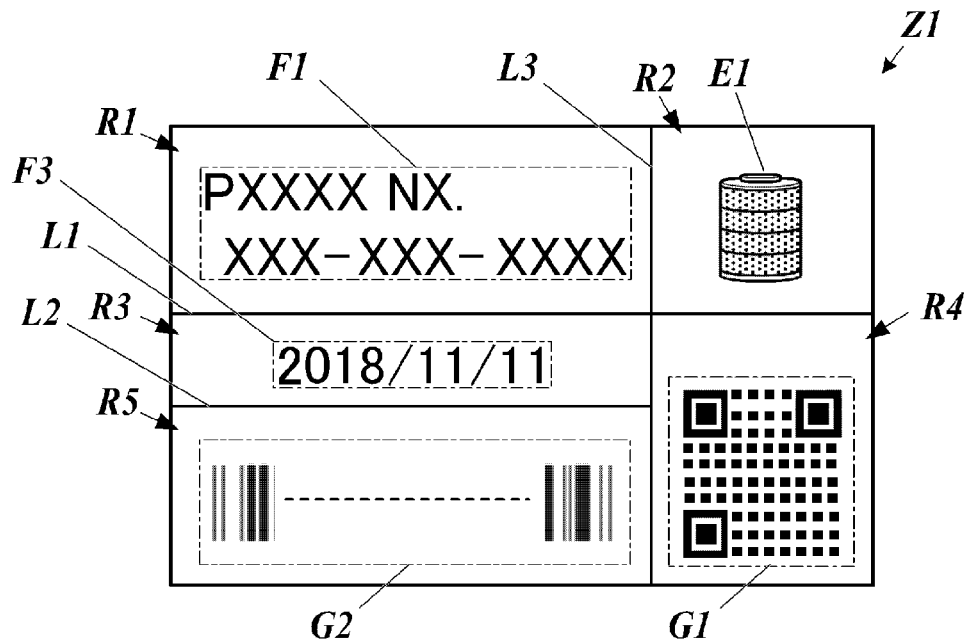
FIG. 9 illustrates an image depicting a presentation example according to the third embodiment.
Figure 10:
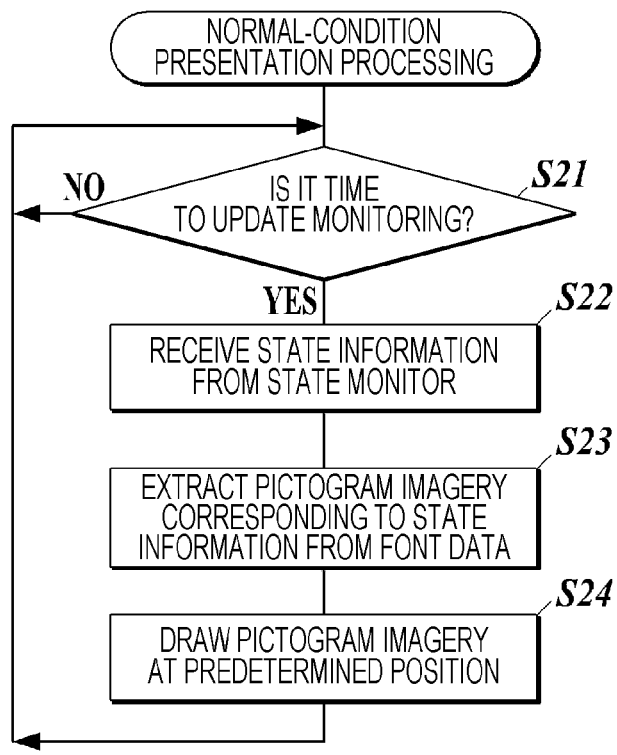
FIG. 10 is a flowchart depicting normal-condition presentation processing performed by a CPU according to the third embodiment.

FIG. 8 is a block diagram depicting an internal configuration of an RFID tag according to a third embodiment. FIG. 9 illustrates an image depicting a presentation example of the RFID tag according to the third embodiment. FIG. 10 is a flowchart depicting normal-condition presentation processing performed by a CPU of a control circuit.

As depicted in FIG. 9, an RFID tag 1B according to the third embodiment differs from the RFID tags in the first and second embodiments in that imagery for presentation Z1 to be output to the display 33 includes a pictogram E1 that represents any kind of state information. The imagery for presentation Z1 includes the pictogram E1 in addition to the information for presentation written by using a reader/writer. Description will be given below in detail with regard to a difference from the first or second embodiment, and similar points will not be described.

The RFID tag 1B according to the third embodiment includes a state monitor 29 configured to monitor the state of the RFID tag 1B as depicted in FIG. 8. In the example in FIG. 8, the state monitor 29 is configured to monitor the state of power generation at the generators 31 and 32 based on the voltage of output from the regulator 21 and supply the state information regarding the monitor target to the CPU 24a. The state monitor 29 may be configured to monitor various states, such as temperature, illuminance, and acceleration. If a secondary battery is installed, the remaining charge level of the secondary battery may be monitored. Although the state monitor 29 is a functional module included in the control circuit 24 in FIG. 8, the state monitor 29 may be a functional module mounted on the circuit board 20 separately from the control circuit 24 or a functional module connected to the circuit board 20 by using wiring.

After completing the presentation processing according to the first or second embodiment, the CPU 24a of the control circuit 24 performs normal-condition presentation processing in FIG. 10. In the normal-condition presentation processing, the CPU 24a determines whether it is predetermined time to update monitoring (step S21). For example, if it is determined that a predetermined period has passed and that it is time to update monitoring, the CPU 24a receives state information from the state monitor 29 (step S22). Then, the CPU 24a extracts from the font data 242 a pictogram (for example, representing the amount of generated electric power) that corresponds to the state information (step S23) and performs drawing processing so as to output the pictogram E1 at a predetermined position on the display 33 (step S24). In step S24, the CPU 24a performs the drawing processing by writing the raster data of the pictogram to the display memory 33a at an address corresponding to the predetermined position. The position at which the pictogram E1 is output may be determined in advance or configured to be specified in the information for presentation written by using a reader/writer.

As described above, the RFID tag 1b according to the third embodiment can output and present the state information in addition to the information for presentation written by using a reader/writer. Further, the CPU 24a can include the state information as the pictogram E1 in the imagery for presentation Z1 by using the font data 242.

Each embodiment of the present disclosure has been described above. An RFID tag according to the present disclosure is not limited to the RFID tags in the above embodiments. For example, although information to be output and presented is written to the first repository 251 of the IC for RFID 25 by using a reader/writer in the configurations according to the above embodiments, information to be output and presented may be stored in the second repository 252 or in the third repository 253 of the IC for RFID 25. Further, the font data 242 may include fonts in multiple sizes, and character-string data may include data for specifying a font size. The details described in the embodiments are modifiable as appropriate within the spirit of the invention.

INDUSTRIAL APPLICABILITY

The present disclosure can be applied to an RFID tag having a display.

REFERENCE SIGNS LIST 1, 1B RFID tag
20 circuit board
21 regulator
24 control circuit
24a CPU
24b ROM
24c RAM
241 presentation processing program
242 font data
25 IC for RFID
251 first repository
31, 32 generator
33 display
33a display memory
33b panel portion
Z0, Z1 imagery for presentation
L1 to L3 ruled line
R1 to R5 presentation section
F1 to F3 character string
G1, G2 pattern
E1 pictogram
29 state monitor

The invention claimed is:

1. An RFID tag comprising:
an IC for RFID to which information for presentation can be written by wireless communication;
a display; and
a control circuit configured to output presentation data to the display,
wherein the control circuit includes
a font repository storing font data, and
a data processor configured to create the presentation data by using one or more character codes and the font data, the one or more character codes being included in the information for presentation,
wherein the data processor is configured to identify character-string data including one or more character codes, ruled-line data, and image data in the information for presentation, and to create presentation data of imagery for presentation, the imagery including one or more character strings based on the character-string data, one or more ruled lines based on the ruled-line data, and one or more patterns represented by the image data.

2. The RFID tag according to claim 1,
wherein the ruled-line data includes information regarding positions of the one or more ruled lines, and
the data processor is configured to,
based on the one or more ruled lines, determine positions of the one or more character strings, positions of the one or more patterns, or both the positions of the one or more character strings and the positions of the one or more patterns.

3. The RFID tag according to claim 2,
wherein the data processor is configured to create presentation data for one screen of the display by using information for presentation that has been split into a plurality of parts, the plurality of parts having been written to the IC for RFID individually.

4. The RFID tag according to claim 3,
wherein the presentation data created by the data processor further includes one or more pictograms formed by using state information and the font data, the state information being not included in the information for presentation.

5. The RFID tag according to claim 2,
wherein the presentation data created by the data processor further includes one or more pictograms formed by using state information and the font data, the state information being not included in the information for presentation.

6. The RFID tag according to claim 1,
wherein the data processor is configured to create presentation data for one screen of the display by using information for presentation that has been split into a plurality of parts, the plurality of parts having been written to the IC for RFID individually.

7. The RFID tag according to claim 6,
wherein the presentation data created by the data processor further includes one or more pictograms formed by using state information and the font data, the state information being not included in the information for presentation.

8. The RFID tag according to claim 1,
wherein the presentation data created by the data processor further includes one or more pictograms formed by using state information and the font data, the state information being not included in the information for presentation.

9. An RFID tag comprising:
an IC for RFID to which information for presentation can be written by wireless communication;
a display; and
a control circuit configured to output presentation data to the display,
wherein the control circuit includes
a font repository storing font data, and
a data processor configured to create the presentation data by using one or more character codes and the font data, the one or more character codes being included in the information for presentation,
wherein the data processor is configured to create presentation data for one screen of the display by using information for presentation that has been split into a plurality of parts, the plurality of parts having been written to the IC for RFID individually.

10. The RFID tag according to claim 9,
wherein the presentation data created by the data processor further includes one or more pictograms formed by using state information and the font data, the state information being not included in the information for presentation.

11. An RFID tag comprising:
an IC for RFID to which information for presentation can be written by wireless communication;
a display; and
a control circuit configured to output presentation data to the display,
wherein the control circuit includes
a font repository storing font data, and
a data processor configured to create the presentation data by using one or more character codes and the font data, the one or more character codes being included in the information for presentation,
wherein the presentation data created by the data processor further includes one or more pictograms formed by using state information and the font data, the state information being not included in the information for presentation.

* * * * *